Figure 1:
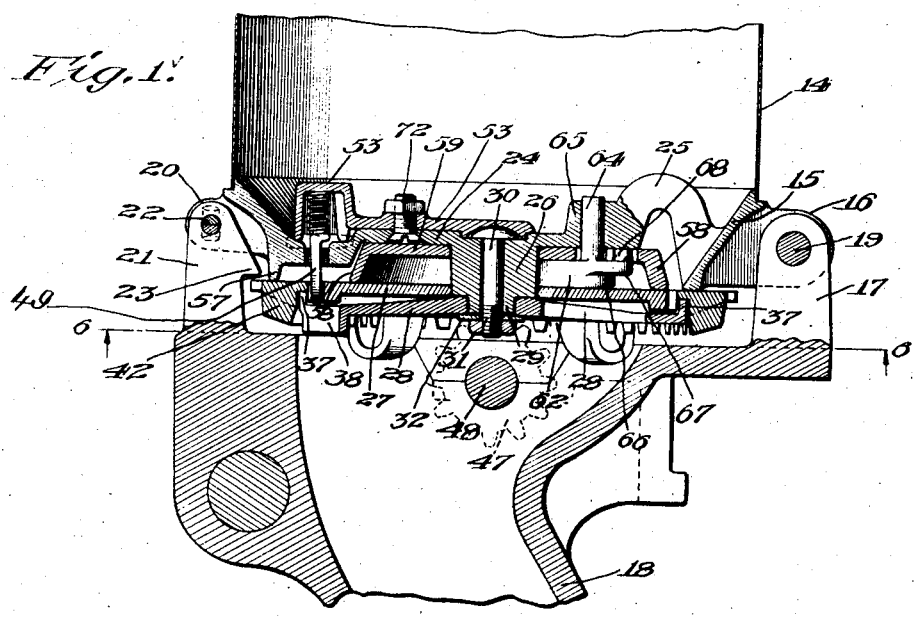

No. 834,993. PATENTED NOV. 6, 1906.
W. L. PAUL.
SEEDING MACHINE.
APPLICATION FILED JAN. 18, 1904.

4 SHEETS—SHEET 1.

Witnesses:
M. J. McPike
Robert H. Weir

Inventor:
William L. Paul,
by Bond, Adams, Pickard & Jackson
his Attys.

No. 834,993. PATENTED NOV. 6, 1906.
W. L. PAUL.
SEEDING MACHINE.
APPLICATION FILED JAN. 18, 1904.
4 SHEETS—SHEET 2.
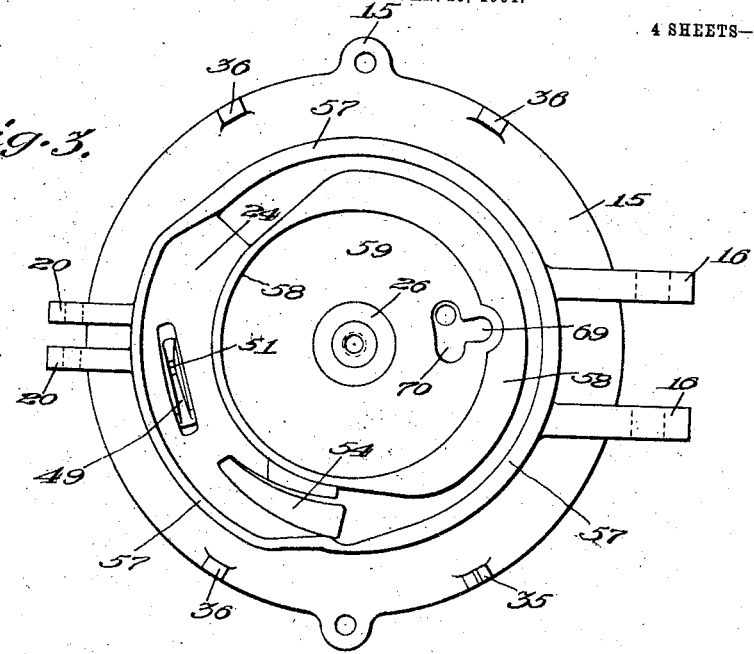
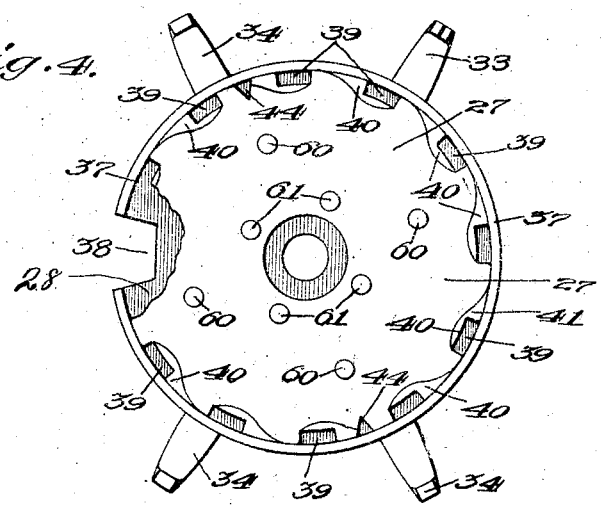
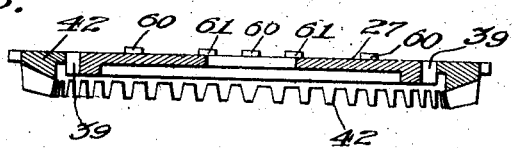
Witnesses:
M. J. McPike
Robert H. Wen
Inventor:
William L. Paul,
by Bond Adams Pickard Jackson
his Attys.

No. 834,993. PATENTED NOV. 6, 1906.
W. L. PAUL.
SEEDING MACHINE.
APPLICATION FILED JAN. 18, 1904.
4 SHEETS—SHEET 3.
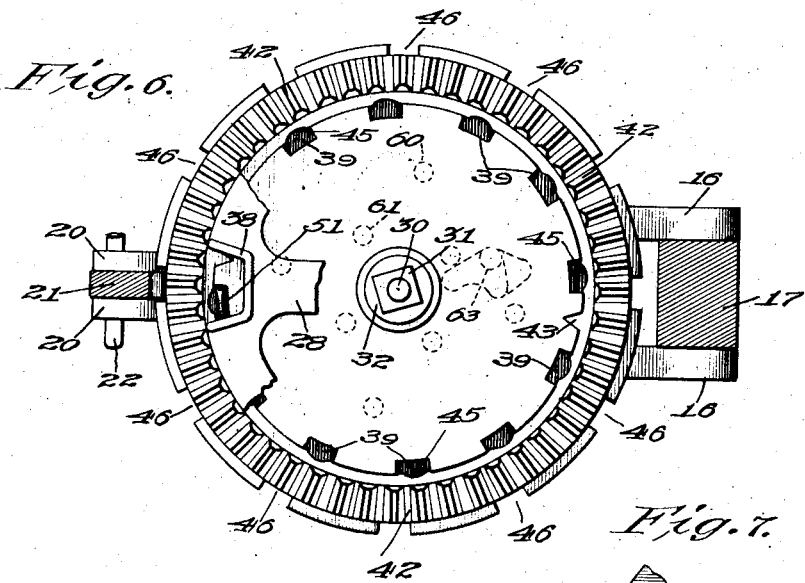
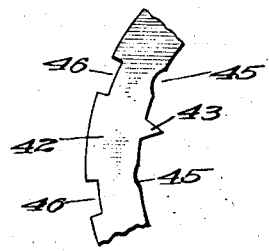
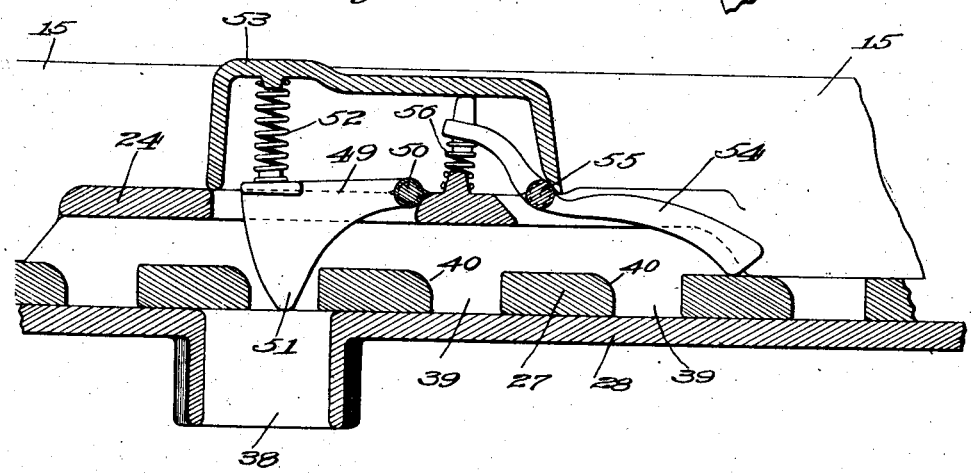
Witnesses:
M. J. McPike
Robert F. Weir
Inventor:
William L. Paul,
by Bond, Adams, McCarr & Jackson
his Attys.

No. 834,993. PATENTED NOV. 6, 1906.
W. L. PAUL.
SEEDING MACHINE.
APPLICATION FILED JAN. 18, 1904.
4 SHEETS—SHEET 4.
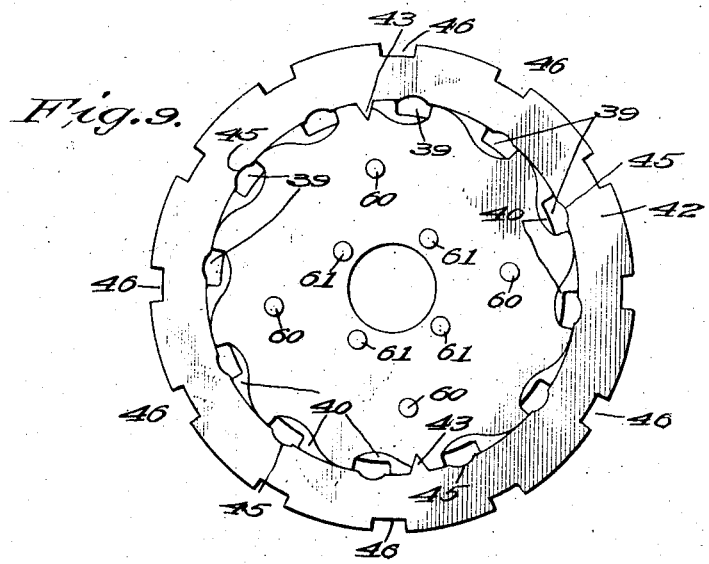
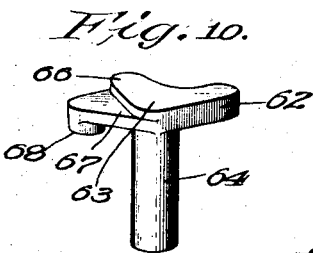
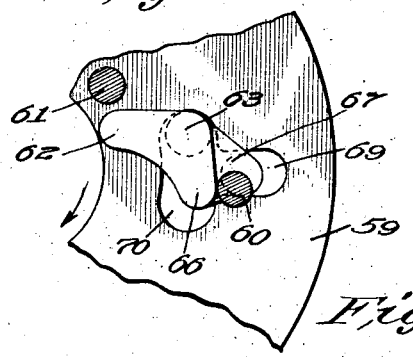
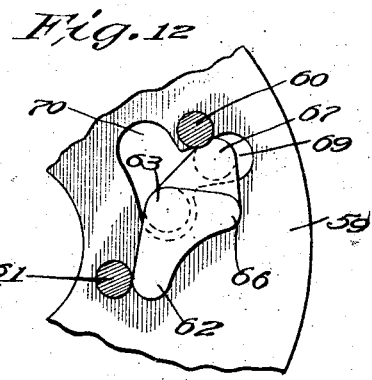
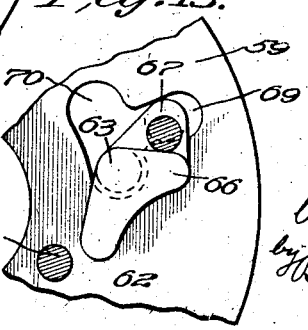
Witnesses:
M. J. M?ike
Robert H. Weir
Inventor
William L. Paul
by Bondurant & his Attys.

UNITED STATES PATENT OFFICE.

WILLIAM L. PAUL, OF BRADLEY, ILLINOIS, ASSIGNOR TO DAVID BRADLEY MANUFACTURING COMPANY, OF BRADLEY, ILLINOIS, A CORPORATION OF ILLINOIS.

SEEDING-MACHINE

No. 834,993.   Specification of Letters Patent.   Patented Nov. 6, 1906.

Application filed January 18, 1904. Serial No. 189,648.

*To all whom it may concern:*

Be it known that I, WILLIAM L. PAUL, a citizen of the United States, residing at Bradley, in the county of Kankakee and State of Illinois, have invented certain new and useful Improvements in Seeding Devices, of which the following is a specification, reference being had to the accompanying drawings.

My invention relates to seeding devices, and particularly to corn-planters.

It has for its object to provide new and improved mechanism for regulating the delivery of seed from the hopper, so that the dropping of the seed may be accurately controlled to regulate the number of seed dropped.

Further objects are to provide for dropping accurately kernels of irregular shape, to prevent choking of the machine, to provide improved agitating devices for agitating the seed in the hopper, and to otherwise improve the construction of seeding devices of this character.

I accomplish these objects as hereinafter described and as illustrated in the drawings.

What I regard as new is set forth in the claims.

Figure 2:
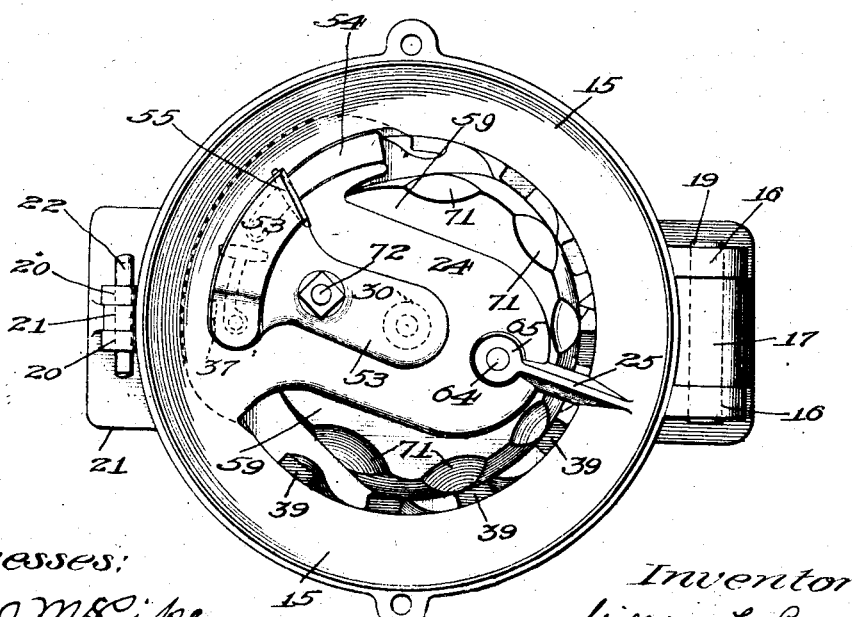

In the accompanying drawings, Figure 1 is a central longitudinal vertical section of my improved apparatus. Fig. 2 is a plan view showing the inside of the seedbox or hopper. Fig. 3 is an under side view of the supporting-frame, which carries the other parts of the mechanism and the agitator. Fig. 4 is a plan view of the seed-plate and seed-plate-carrying frame, part of the seed-plate being broken away. Fig. 5 is a longitudinal section of the seed-plate and the ring-gear or annular rack by which it is driven. Fig. 6 is a section on line 6 6 of Fig. 1, part of the seed-plate-supporting frame being removed. Fig. 7 is a partial plan view of the ring-gear for driving the seed-plate. Fig. 8 is an enlarged sectional detail illustrating the seed-discharging pawl or "knocker" and the cut-off which regulates the admission of seed from the seedbox to the outlet. Fig. 9 is a plan view of the seed-plate and ring-gear which drives it. Fig. 10 is a perspective view of the agitator-operating device, showing it inverted; and Figs. 11, 12, and 13 are views illustrating different positions of the agitator-operating device with relation to the agitator.

Referring to the drawings, 14 indicates the seedbox or hopper, which may be of any suitable shape, but is preferably cylindrical and made of sheet-iron. The bottom of the hopper is formed by a frame 15 (best shown in Fig. 1) and provided at one side with ears 16, adapted to be pivoted to a support 17, carried by the upper portion of the seed-tube 18, as shown in Fig. 1. By this arrangement the hopper may be tilted, rocking about a pivot 19. At the opposite side the frame 15 is provided with ears 20, which receive a lug 21, also projecting from the upper portion of the seed-tube, as shown in Figs. 1 and 2. A split key 22 or other suitable means serves to secure the frame 15 in place. The lug 21 is provided at its inner side with a tooth 23, which is adapted to project over a part of the ring-gear, which operates the seed plate, and prevent the seedbox from being tilted except when one of the seedcups or recesses lies over the discharge-opening, as will be hereinafter described.

As best shown in Fig. 1, the bottom frame 15 of the hopper is annular in form and is provided with a segmental bottom plate 24, which projects from one side of the frame 15 and is braced by a brace 25 at the opposite side thereof, as shown in Figs. 1 and 2. The bottom plate 24 serves to support certain parts of the apparatus. As shown in Fig. 1, it is provided centrally with a downwardly-projecting boss or hub 26, upon which are mounted a seed-plate 27 and a seed-plate-supporting frame 28, as shown in Fig. 1. The seed-plate-supporting frame 28 is fitted upon a reduced portion 29 of the boss and is held in place by a bolt 30, having a nut 31 and washer 32 at its lower end, as shown in Fig. 1. The seed-plate 27 rests upon the seed-plate-supporting frame 28 and is fitted upon the boss 26 above said frame. As best shown in Fig. 4, the seed-plate-supporting frame is provided with a number of arms 33 34, preferably four, which project upwardly and engage downwardly-extending arms 35 36, carried by the bottom frame 15. The arms 34 and 36 are flattened, so as to abut squarely against one another, while the arm 33 is provided with an edge adapted to fit into a V-shaped recess provided in the lower face of the arm 35, the object being to keep the parts from getting out of position when they are secured together. Obviously other equivalent means may be employed for this purpose.

As shown in Figs. 1 and 4, the seed-plate-supporting frame 28 is provided with an upwardly-projecting marginal flange 37, the inner diameter of which is slightly greater than the greatest diameter of the seed-plate 27, so that, as shown in Fig. 4, the seed-plate is adapted to rotate within said flange. At one point in its periphery the seed-plate-supporting frame is provided with a notch 38 somewhat wider than the seed cups or recesses 39 in the seed-plate, the latter, as shown in Fig. 4, being arranged at regular intervals around the periphery of the seed-plate. The recess 38 is also deeper than the seed-cups, so that when the seed drops from said seed-cups there is no danger of its being impeded by the seed-plate-supporting frame. As best shown in Figs. 4 and 9, that portion of the upper surface of the seed-plate lying within and forward of the seed-cups 39 is beveled, as shown at 40 41, so as to facilitate the entrance of the kernels into the seed-cups. The seed-plate-supporting frame also supports an annular rack or ring-gear 42, by which the seed-plate is rotated. The rack 42 rests upon the upper surface of the flange 37, as shown in Fig. 1, and is so arranged with reference to the seed-plate 27 as to lie in substantially the same horizontal plane therewith. This is best secured by making the seed-plate-supporting frame somewhat conical—that is to say, having the central portion thereof higher than the outer portion, so that the upper surface of the seed-plate lies a short distance above the upper surface of the flange 37, such distance being equal to the thickness of that portion of the rack 42, which rests upon said flange. By this construction the upper surface of the annular rack 42 forms practically an extension of the seed-plate, the seed-cups lying a considerable distance from the margin of said rack, as shown in Fig. 9. The seed-plate and rack are connected, so that the seed-plate rotates in unison with said rack by means of lugs 43, which fit in suitable recesses 44, provided in the margin of the seed-plate, as shown in Figs. 4 and 9. As shown in Fig. 1, a considerable portion of the upper surface of the rack 42 adjacent to the recess or discharge-opening 38 lies within the seed-box, so that kernels can be carried upon it past said opening, as hereinafter described.

Opposite each seed-cup 39 concavities 45 are provided in the inner margin of the rack 42, as shown in Fig. 9. The object of such concavities is to accommodate kernels of irregular shape and to permit their proper delivery from the seedbox. Except at the recess 38, the flange 37 of the seed-plate-supporting frame forms the lower outer portion of the seed-cups, the upper outer portion thereof being formed by the inner margin of the rack 42. When, however, by the rotation of the seed-plate any seed-cup reaches the recess 38, the inner portion of the rack alone serves as the outer portion of the seed-cup. Consequently an enlarged area is provided for the discharge of the seed, which suffices to accommodate kernels of unusual size or shape, thus insuring the invariable delivery of the kernel.

As shown in Fig. 1, the outer margin of the rack 42 projects under the tooth 23 of the lug 21, and to permit the hopper to be tilted recesses 46 are provided at suitable intervals around the margin of said rack, as shown in Fig. 9. Said recesses are so placed as to prevent the hopper from being tilted except when one of the seed-cups overlies the recess 38 and has discharged its contents.

As indicated by dotted lines in Fig. 1, the rack 42 is driven by a beveled gear 47, mounted on a shaft 48, driven from the carrying-wheels in any suitable manner. The discharge of the seed from the seed-cups is insured and reverse operation of the seed-plate prevented by means of a spring-pawl 49, pivotally-supported by the bottom frame 15, as shown at 50 in Fig. 8, and adapted to enter the seed-cups successively, as therein shown. To this end the pawl 49 is provided with a pointed lower end 51 and is generally triangular in form. A spring 52, which bears at its lower end upon the upper surface of the pawl 49 and at its upper end against a housing 53, secured upon the frame 15, serves to yieldingly press down upon the pawl 49 and cause it to discharge the seed in the seed-cups. The pawl 49 is placed over the recesses 38, as shown in Fig. 8, so that the seed is discharged at that point.

54 indicates a cut-off which is arranged to bear upon the seed-plate in advance of the pawl 49, to prevent the seed from entering the housing in a mass. Said cut-off is pivotally mounted upon the frame 15 and bottom plate 24, as shown at 55 in Figs. 2 and 8, and is provided with a spring 56, placed between the inner end thereof and the frame 15, so that the outer end of said cut-off is depressed and held yieldingly in contact with the upper surface of the seed-plate. As shown in Fig. 8, the outer end of the cut-off 54 overlies the seed-cups, so that as the seed-plate rotates the cut-off in great measure prevents the mass of seed from passing under the bottom plate 24 to the discharge-opening 38, only such seed being carried under the bottom plate as is contained in the seed-pockets, which are designed to contain only a single seed in edgewise position. Occasionally, however, a number of kernels are carried around under the cut-off 54; but in such cases the accuracy of the discharge is not affected, for the reason that only the seed actually in the seed-cup has access to the discharge-opening. The remaining kernels are carried around back into the seedbox without choking the apparatus by reason of the fact that an extended carrying-surface therefor is provided by making the upper surface of the rack a substantial extension of the seed-plate, as hereinbefore described. The kernels when thus carried around are guided by means of an outer flange 57, depending from the bottom of the seedbox-frame 15, and an inner flange 58, depending from an agitator-disk 59, which is mounted centrally in the bottom of the seed-box, as best shown in Figs. 1 and 2. The flanges 57 58 are best shown in Figs. 1 and 3. As best shown in Figs. 1 and 3, the flanges 57 58 are widely separated adjacent to the discharge-passage 38, at which point they lie under the bottom plate 24. In the open part of the seedbox, however, they are separated only by a distance substantially equal to the thickness of a kernel of corn, as shown in Figs. 1, 2, and 3. The arrangement is such that in the open part of the seedbox said flanges serve as guides to direct the kernels edgewise into the seed-cups, while those portions of said flanges which extend under the bottom plate are far enough from the pawl 49 to permit kernels lying on the upper surface of the seed-plate and rack 42 to pass freely at each side of said pawl, so that they may be carried back into the seedbox without being discharged and without clogging the apparatus. I thus avoid choking of the machine, even though a large number of extra kernels may be carried under the bottom plate, since such extra kernels simply pass around under the bottom plate back into the open part of the seedbox. This, however, does not interfere with the discharge of the seed in the seed-cups, as the action of the discharge-pawl 49 is not interfered with by such extra kernels.

The agitator-disk 59, as best shown in Fig. 1, is mounted on the boss or hub 26, its flange 58 resting on the seed-plate 27. As shown, said flange extends outward and downward, and the inner face of the seedbox-frame 15 is oppositely inclined, so that the seed is properly directed to the seed-cups in an edgewise position. The agitator 59 is oscillated to agitate the grain in the seedbox by means of suitable devices operated by the rotation of the seed-plate. The operating devices for the agitator are best shown in Fig. 1 and Figs. 9 to 13, inclusive. As therein shown, the seed-plate is provided on its upper surface with a series of outer pins 60, placed equally distant from its axis, and a series of inner pins 61, also equally distant from the axis, but lying closer thereto than the pins 60. The pins 61 are adapted to engage the inner arm 62 of a rocking dog 63, which is adapted to rock about a vertical axis, being provided with a stud 64, journaled in a suitable bearing 65, carried by the bottom plate 24, as shown in Fig. 1. The outer pins 60 are adapted to engage the outer arm 66 of said dog, said arm extending at an angle to the arm 62, as shown in Figs. 10 to 13. Obviously, as shown in Figs. 11, 12, and 13, the engagement of the outer arm 66 by the pins 60 will rock the dog in one direction, while the engagement of the opposite arm 62 by the pins 61 will swing it in the opposite direction. The rocking motion of the dog 63 is communicated to the agitator 59 by means of an arm 67, which carries a pin 68, projecting into a slot 69 in the agitator 59, as shown in Figs. 11 to 13, so that when the dog 63 rocks the agitator is carried with it in one direction or the other. In order to permit such movement of the agitator, it is provided with a slot 70, through which the stud 64 passes, as shown in Figs. 11, 12, and 13, the two slots 69 70 together forming a T, as shown. In order to enable the agitator to better engage the grain, its upper surface is provided with a series of depressions or irregularities 71, as shown in Fig. 2.

As best shown in Figs. 1 and 2, the housing 53 is secured upon the bottom plate 24 by means of a bolt 72, so that it may be readily removed when desired, and said housing serves also to cover and protect the upper end of the bolt 30, over which it extends.

Having thus described in detail the embodiment of my invention illustrated in the accompanying drawings, I wish it to be understood that my invention is not restricted specifically to the construction shown except in so far as such details are particularly claimed, as it includes generically the subject-matter of the broader claims.

That which I claim as my invention, and desire to secure by Letters Patent, is—

1. In a seeding device, the combination of a seedbox, an agitator, a rotary seed-plate, and separate means between the seed-plate and the agitator operated by the rotation of the seed-plate for actuating the agitator, substantially as described.

2. In a seeding device, the combination of a seedbox, an agitator, a rotary seed-plate, means for rotating said seed-plate in a constant direction, and separate means between the seed-plate and the agitator and actuated by rotation of the seed-plate for oscillating said agitator, substantially as described.

3. In a seeding device, the combination of a seedbox, an agitator, a rotary seed-plate, means for rotating said seed-plate in a constant direction, and separate means adapted to engage the seed-plate and the agitator and operated by the rotation of the seed-plate for oscillating said agitator, substantially as described.

4. In a seeding device, the combination of a seedbox, an agitator, a rotary seed-plate, means for rotating said seed-plate, a rocking dog between the seed-plate and the agitator for oscillating said agitator, and means operated by the rotation of the seed-plate for rocking said dog, substantially as described.

5. In a seeding device, the combination of a seedbox, an agitator, a rotary seed-plate, means for rotating said seed-plate, a pivotally-mounted rocking dog for oscillating said agitator, and pins carried by said seed-plate adapted to engage said dog at opposite sides of its pivot for rocking the same as the seed-plate rotates, substantially as described.

6. In a seeding device, the combination of a seedbox, an agitator, a rotary seed-plate, means for rotating said seed-plate, a pivotally-mounted rocking dog having arms, pins carried by said seed-plate adapted to engage said arms for rocking said dog, and an arm carried by said dog adapted to engage said agitator for oscillating the same when said dog is rocked, substantially as described.

7. In a seeding device, the combination of a seedbox, a bottom plate therefor, an agitator mounted under said bottom plate, a seed-plate upon which said agitator rests, means for rotating said seed-plate, a rocking dog pivotally mounted in said bottom plate, arms carried by said dog adjacent to said seed-plate, pins carried by said seed-plate adapted to engage said arms for rocking the same, and means for oscillating said agitator by the rocking of said dog, substantially as described.

8. In a seeding device, the combination of a seedbox, a seed-plate having seed-cups, means forming an extension of said seed-plate and having recesses opposite the seed-cups, and means for driving said seed-plate, substantially as described.

9. In a seeding device, the combination of a seedbox, a seed-plate having seed-cups, an annular member adapted to encircle said seed-plate forming an extension thereof and having recesses opposite the seed-cups, and means for driving said seed-plate, substantially as described.

10. In a seeding device, the combination of a seedbox, a seed-plate having seed-cups, an annular rack adapted to encircle said seed-plate and form an extension thereof said rack having recesses opposite said seed-cups, and means connecting said seed-plate and rack, substantially as described.

11. A seed-plate, comprising an inner member having seed-cups in its periphery, and an outer annular member having recesses registering with said seed-cups.

12. In a seeding device, the combination of a seedbox, a seed-plate having seed-cups in its periphery, means forming an extension of said seed-plate, said extension having recesses opposite said seed-cups, and means for driving said seed-plate, substantially as described.

13. In a seeding device, the combination of a seedbox having a discharge-opening, a seed-plate, an annular member adapted to encircle said seed-plate and form an extension thereof, seed-cups in the outer margin of said seed-plate, means overlying said seed-plate and acting to control the passage of seed to the discharge-opening, the upper surfaces of said seed-plate and extension being exposed adjacent to the discharge-opening, means for supporting said extension so that its upper surface lies substantially in the plane of the upper surface of the seed-plate, means connecting said seed-plate and extension, and driving mechanism for rotating said seed-plate and extension.

14. In a seeding device, the combination of a seedbox, a seed-plate having seed-cups in its periphery, an annular extension for said seed-plate having recesses opposite said seed-cups, a seed-plate-supporting frame, and a flange carried by said frame and projecting up beside the periphery of said seed-plate, said seed-plate-supporting frame having a discharge-passage, substantially as described.

15. In a seeding device, the combination of a seedbox, a seed-plate having seed-cups in its periphery, a seed-plate-supporting frame, a flange carried by said frame and projecting up beside the periphery of said seed-plate, a seed-plate extension extending over said flange and having recesses opposite said seed-cups, and means for driving said seed-plate, substantially as described.

16. In a seeding device, the combination of a seedbox, a seed-plate having seed-cups in its periphery, a seed-plate-supporting frame, a flange carried by said frame and projecting up beside the periphery of said seed-plate, a seed-plate extension extending over said flange and having recesses opposite said seed-cups, means for driving said seed-plate, and means connecting said extension and said plate, substantially as described.

17. In a seeding device, the combination of a seedbox, a seed-plate having seed-cups in its periphery, a seed-plate-supporting frame, a flange carried by said frame and projecting up beside the periphery of said seed-plate, a seed-plate extension extending over said flange, means for driving said seed-plate, and means connecting said extension and said plate, said extension having recesses opposite said seed-cups, substantially as described.

18. In a seeding device, the combination of a seedbox, a seed-plate having seed-cups in its periphery, a seed-plate-supporting frame, a flange carried by said frame and projecting up beside the periphery of said seed-plate, said seed-plate-supporting frame having a discharge-passage, an annular rack extending over said flange, means connecting said rack with said seed-plate, said rack having recesses opposite said seed-cups, substantially as described.

19. In a seeding device, the combination of a seedbox, a seed-plate, seed-cups therein, a discharge-passage, means for rotating said seed-plate to cause the seed-cups to move over said discharge-passage, and means having its upper surface in the plane of the upper surface of the seed-plate and rotating therewith for carrying surplus seed past the discharge-passage back to the seedbox.

20. In a seeding device, the combination of a seedbox, a seed-plate, seed-cups therein, a discharge-passage, means for rotating said seed-plate to cause the seed-cups to move over said discharge-passage, and means externally arranged relatively to said seed-plate and having its upper surface in the plane of the upper surface of the seed-plate and rotating therewith for carrying surplus seed past the discharge-passage back to the seedbox.

21. In a seeding device, the combination of a seedbox, a seed-plate having seed-cups, means connected with said seed-plate forming an extension thereof, a discharge-passage over which said seed-cups pass as the seed-plate rotates, and guides for directing the seed to said seed-cups, said guides being more widely separated adjacent to said discharge-passage to permit seed to be carried on the surface of the seed-plate past said discharge-passage without being discharged.

22. In a seeding device, the combination of a seedbox, a seed-plate, seed-cups therein, a discharge-passage, means for rotating said seed-plate to cause the seed-cups to discharge their contents into said discharge-passage, means externally arranged relatively to said seed-cups for carrying surplus seed past the discharge-passage back to the seedbox, and guiding devices for guiding kernels singly to said seed-cups, said guiding devices being more widely separated adjacent to said discharge-passage.

23. In a seeding device, the combination of a seedbox, a seed-plate having seed-cups, in its periphery, a discharge-passage, means for rotating said seed-plate to cause the seed-cups to move over said discharge-passage, an annular extension for said seed-plate, said extension being arranged to rotate with said seed-plate, and guiding devices, said guiding devices being arranged to guide kernels singly to said seed-cups and being more widely separated opposite said discharge-passage.

24. In a seeding device, the combination of a seedbox, a seed-plate having seed-cups, means connected with said seed-plate forming an extension thereof, a discharge-passage over which said seed-cups pass as the seed-plate rotates, guides for directing the seed to said seed-cups, said guides being more widely separated adjacent to said discharge-passage to permit seed to be carried on the surface of the seed-plate past said discharge-passage without being discharged, and means for discharging seed in said seed-cups through said discharge-passage.

WILLIAM L. PAUL.

Witnesses:
DAVID BRADLEY MORGAN,
F. W. BICKNELL.